April 21, 1931.　　　E. C. DALRYMPLE　　　1,801,726
AUTOMOBILE TRUCK
Filed Dec. 3, 1927　　　3 Sheets-Sheet 1
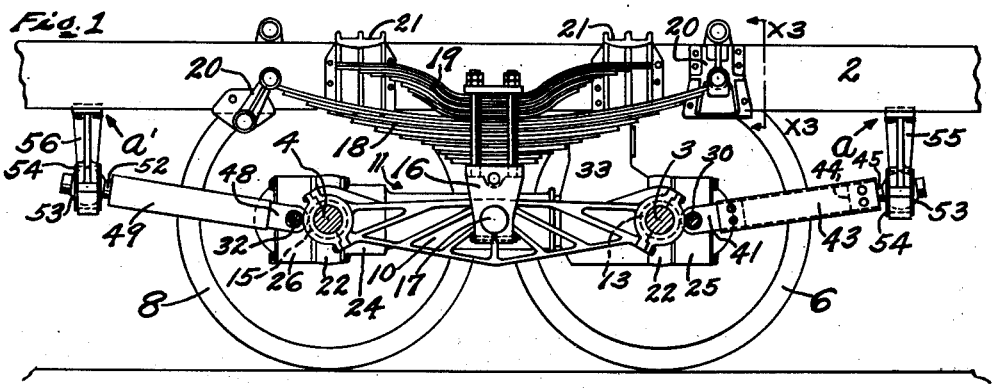
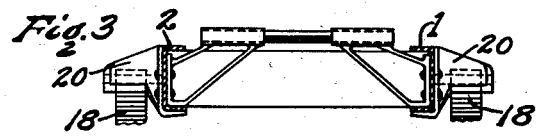
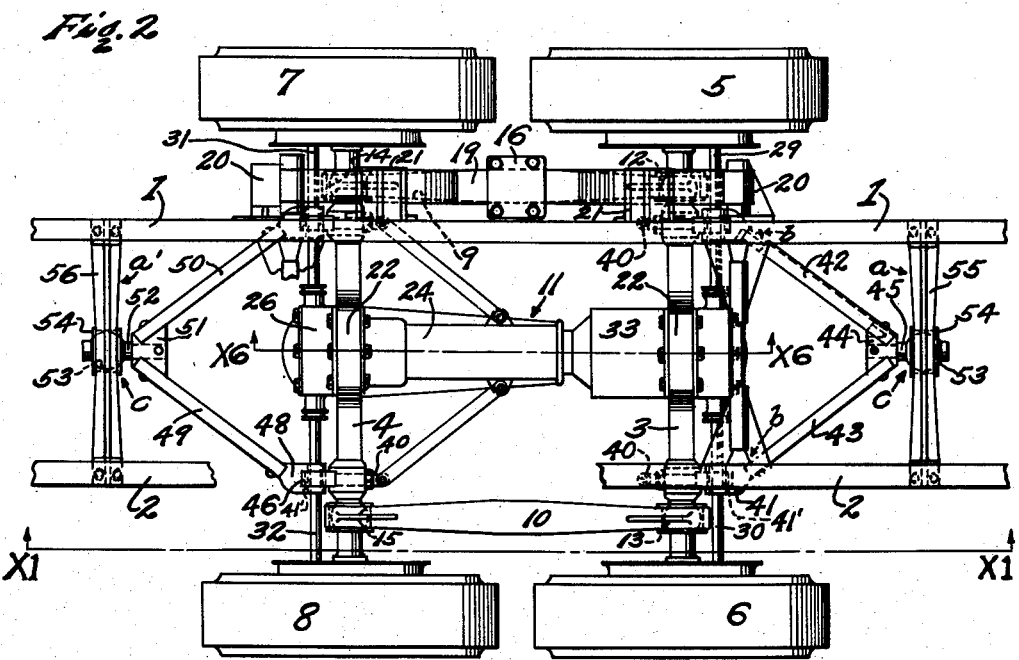
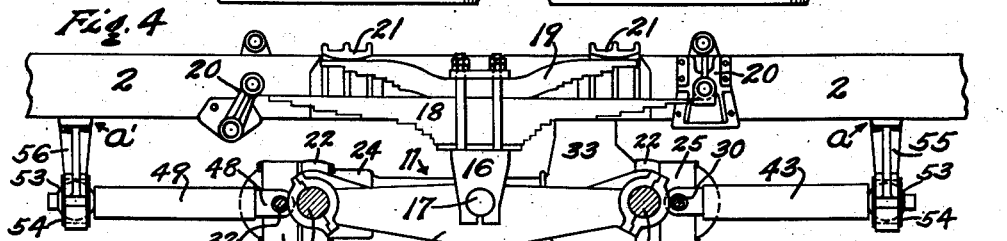
INVENTOR
EARL C. DALRYMPLE
WITNESS:
John A. McDowell

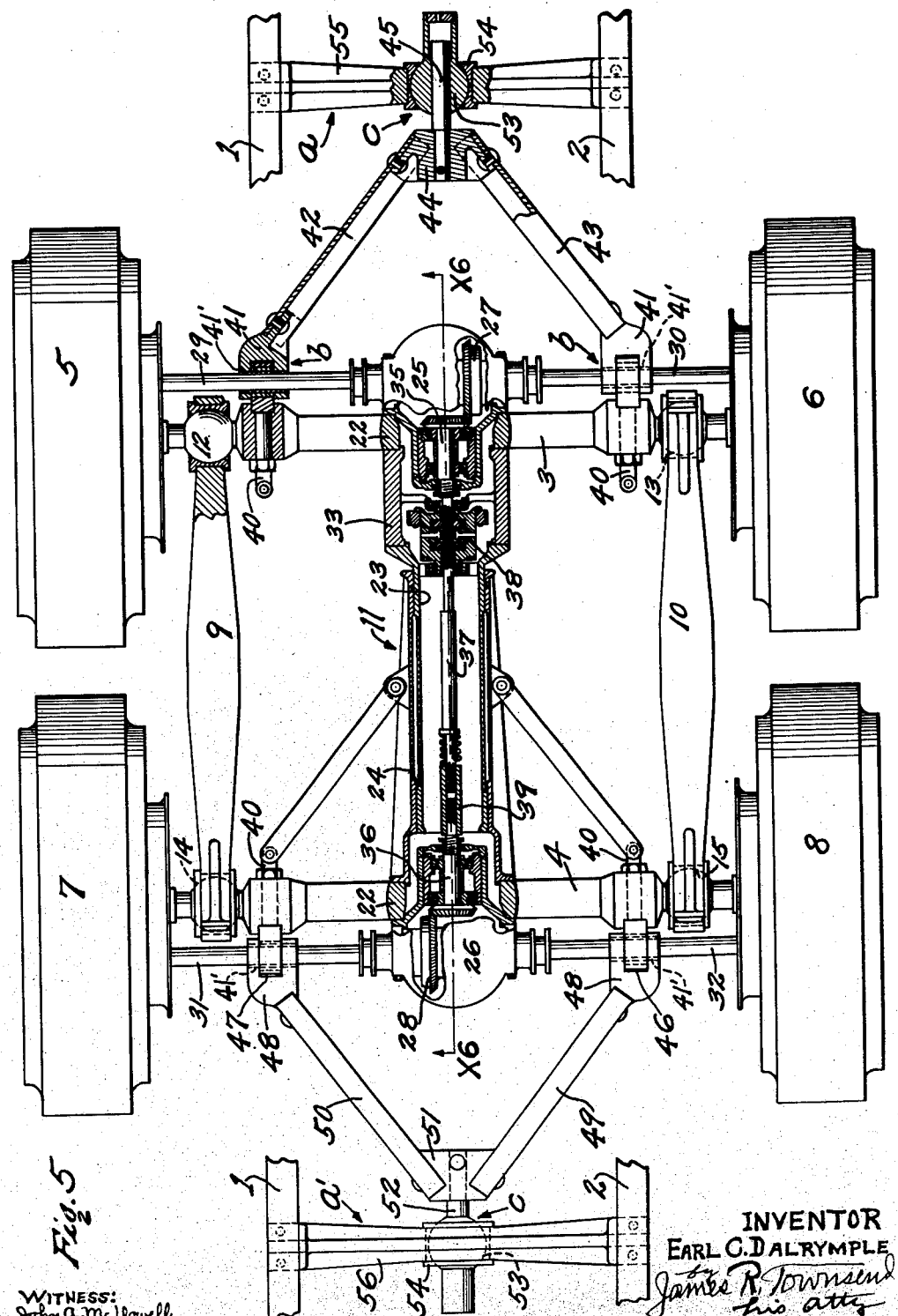

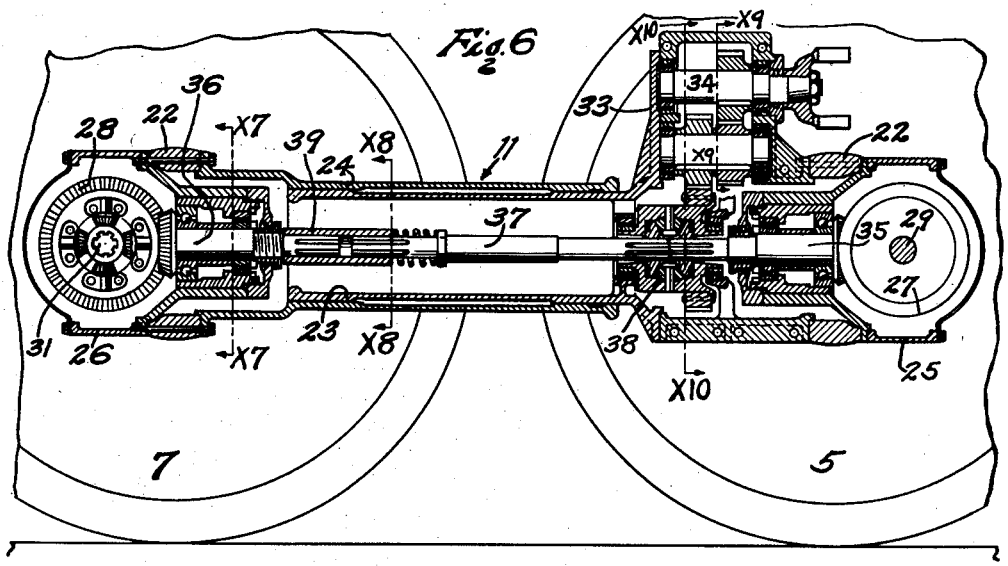
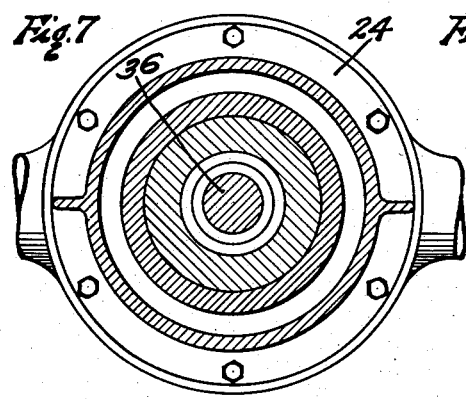
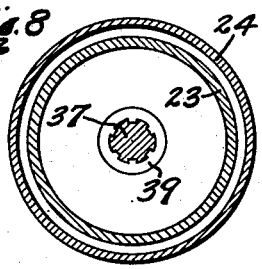
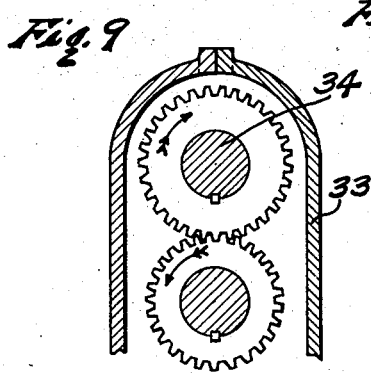
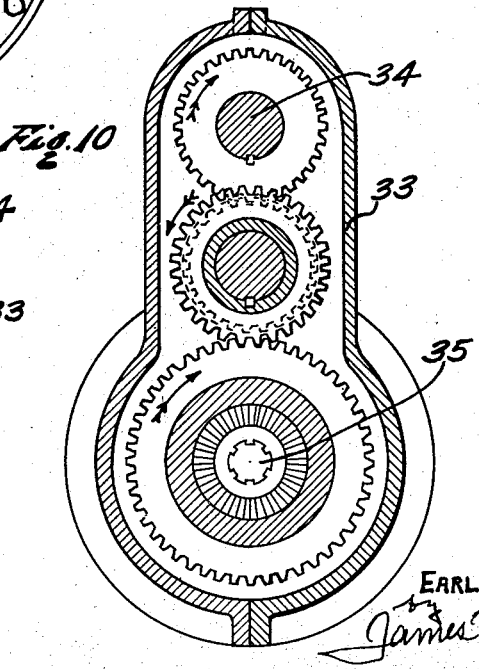

Patented Apr. 21, 1931

1,801,726

UNITED STATES PATENT OFFICE

EARL C. DALRYMPLE, OF LOS ANGELES, CALIFORNIA, ASSIGNOR TO F. GEIGER TRUCK CO., A PARTNERSHIP UNDER THE LAWS OF CALIFORNIA, COMPOSED OF FELIX GEIGER, JOE BLATTLER, AND FRED S. FROST

AUTOMOBILE TRUCK

Application filed December 3, 1927. Serial No. 237,384.

This invention relates more particularly to heavy duty trucks having more than two axles and is especially directed to means for connecting a four wheeled carriage to a chassis to maintain relative alinement of the carriage and chassis to minimize chassis swaying and to secure substantially equal traction, or road contact, of the several wheels.

The structure of my invention is particularly designed for use in connection with so-called six wheel trucks involving a single axle and a pair of steering wheels at the front of the truck, and a pair of axles, with driving wheels, at the rear of the truck.

It is common to construct a carriage having two axles, and a carriage frame having flexible connection with the axles, and to connect such frame to a chassis, by supports involving springs and rockable elements, which supports constitute the carriage alining means and which alone is relied upon to prevent undesirable, or excessive rocking motion of the chassis and its load in a lateral direction relative to the carriage.

Experience has developed that such carriage alining and load sustaining means, when made of a size and strength to properly function as yielding, or cushioned load sustaining means, were incapable of holding the carriage alined with the chassis, and also holding the chassis against lateral rocking movement.

It has been common to provide such a carriage with a driving gear for relating a propeller shaft with the driving shafts of the several wheels, and by reason of the flexure of the carriage frame, such driving gear required universal joints in order that the gear as a whole might flex with the carriage, and such joints are subject to damage and breakage, and it is common to provide between the two axles of such carriage a torque which is both structurally and functionally distinct from the gear.

An object of this invention is to provide means, of simple, durable and inexpensive construction, for connecting a multi-axled carriage with a chassis or vehicle body frame, in a manner to preserve longitudinally alined relation between the carriage and frame; to minimize swaying of the chassis and its load over the carriage and to minimize shocks or torsional strains on the load supporting springs.

A feature of the invention is that I provide between the propeller shaft and the several wheel driving shafts a driving gear which comprises a variable length, sectional shaft, including a differential gear whereby that part extending between the wheel driving shafts may be flexible without employment of universal or hinge elements between shafts.

A further feature is that I provide in coaxial relation to the variable length shaft, a sectional, variable length, tubular torque, the tubular sections of which are connected, respectively to the two axles of the carriage and I employ such tubular torque as a casing for the driving gear.

An object is to provide a form of drive unit having a full differential action without the use of any universal joint in the propeller shaft that connects the forward and rearward axles, and to secure superior flexibility in travel over uneven roads, and also freedom from lost motion.

This invention includes the parts and the arrangements and combinations of parts hereinafter described and claimed.

An object is to accommodate the relative movement of the body frame and the respective axles and axle ends during spring action under varying loads and road inequalities without strains on the body frame or the connections between the axles and body frame.

This invention is applicable to use in trailers as well as in traction carriages, but will be illustrated herein as applied to a traction carriage.

Other objects, advantages and features of invention may appear from the accompanying drawings, the subjoined detailed description and the appended claims.

The accompanying drawings illustrate the invention.

Figure 1 is a broken side elevation of a carriage and chassis constructed and connected according to this invention and in normal or free from load position, omitting the rear wheels, and showing the axles in section on line x1, Fig. 2.

Fig. 2 is a plan view omitting the springs and portions of the chassis.

Fig. 3 is a detail of the chassis in transverse section on line x3, Fig. 1.

Fig. 4 is a diagrammatic view in loaded position of the parts shown free from load in Fig. 1.

Fig. 5 is an enlarged fragmental plan view partly in section showing details of the driving gear in combination with carriage and chassis.

Fig. 6 is a longitudinal sectional elevation on line x6, Figs. 2 and 5, showing the driving gear.

Fig. 7 is a transverse sectional elevation on line x7, Fig. 6, showing the torque connection with the rear axle.

Fig. 8 is a transverse sectional elevation on line x8, Fig. 6, showing the length varying means of the torque shaft.

Fig. 9 is an elevation in section on line x9, Fig. 6, showing the transmission between the propeller and torque shafts.

Fig. 10 is a transverse section on line x10, Fig. 6, showing a differential between the two sections of the torque shaft.

The chassis comprises the usual sides, or longitudinals, herein shown as of channel section; designated 1 and 2 and hereinafter referred to as body frame members.

The carriage comprises axles 3 and 4; wheels 5 and 6 on the forward axle 3; wheels 7 and 8 on the rear axle 4; carriage sides 9 and 10; a central torque connection 11 between the axles 3 and 4, providing relative forward and rearward and lateral rocking movement of the two axles, and ball and socket joints 12, 13, 14 and 15 connecting the sides 9 and 10 with the axles 3 and 4. The balls are arranged with their centers in the axes of the axles so that the sides 9 and 10 positively hold the axles in parallelism to each other without any cramping action.

The chassis support comprises spring supports 16, which are mounted for longitudinal rocking movements over the carriage sides, as upon the stubs 17 projecting outwardly and laterally from the sides; chassis and load carrying springs 18 and 19 and fixtures 20 and 21 for connecting and relating the springs to the chassis.

The torque 11 is essentially a connection between the axles which provides both longitudinal and lateral rocking movements of the axles relatively, and when employed in a carriage having driving wheels it is desirable to employ same as a casing for the driving gear between the axles. To this end then, I form in each axle a torque element constructed as an open-ended cylinder like collar 22, with which the tubiform telescopic sections 23 and 24 of the recited torque 11 connect and communicate, and with which I also connect casings 25 and 26 for differential gears 27 and 28 for the wheel driving shafts 29, 30, 31 and 32, connected to the wheels 5, 6, 7 and 8 by the usual gears, not shown.

By preference I provide a casing element 33 in the torque line, which is structurally distinct and connects between the torque element 23 and the torque element 22 of the forward axle 3.

The gearing of my invention comprises a transmission shaft 34, (Figs. 6, 9 and 10) for connection with a propeller shaft, not shown, a torque shaft comprising a section 35, for connection with the differential gear 27; a section 36 for connection with the differential gear 28 and an intermediate section 37. Between the sections 35 and 37 is a differential gear 38, which is driven from the transmission shaft 34, and which drives both sections 35 and 37 of the torque and provides flexure in the torque line.

For length variation in the torque shafts, I provide a key-sleeve 39 between the torque shaft sections 36 and 37.

Heretofore torque shafts in power carriages of this type have been made to flex with the carriage by the employment of universal joints between the several shaft sections, and such joints have proven a serious source of trouble from breakage, thus causing delays and expenses that have heretofore appeared unavoidable.

In this invention I eliminate the use of universal joints in the transmission and minimize the objectionable weakness by means of differential gears through which flexible power transmission is effected.

I accomplish this by using two axles, each of which has a universal joint and a differential, and interposing a third universal joint between the differential on the forward axle and the differential on the rear axle. I interpose the third differential between the differentials that are on the forward and rearward axles, respectively. I eliminate the use of universal joints by using the telescopic tube or tubular section which is fastened and brazed rigidly to the rear axle 4. I have another tube 23 that is fastened rigidly to the forward axle 3, this tubular form section 23 telescopes in 24.

It has a limited rotative action and a limited amount of longitudinal action.

In the carriage structures heretofore known having frame elements and axles capable of relative movements and provision for relative movements between such flexible carriages and the chassis, it has been common to rely on springs, or the like, extending between the carriage and the chassis, to hold the carriage and chassis relatively alined. Such service imposes heavy strains upon the springs and subjects them to severe strains.

This invention is broadly new, basic and pioneer in that I relieve the springs from such strains, and introduce alining means distinct from the springs. Such alining means comprise radius bars, connecting to each other the axles of the carriage, and in the form shown constituting the carriage sides 9 and 10; forward and rearward sections of the alining means comprising radius rods and hinge connections, connecting the carriage to the chassis at points $a$, $a'$ both forwardly and rearwardly of the carriage.

The forward alining means comprise hinged joints $b$ adjacent the ends of the axles, and such hinges are shown in the drawings as comprising eye bolts 40 extending through and fixed to the axles; hinge fittings, or knuckles, 41 united to the eye bolts as by suitable pintles 41', and in the construction shown, the wheel driving shafts 29, 30, 31, 32 are extended therethrough; the radius rods 42 and 43 secured at their rear ends to said hinge fittings and extending convergently therefrom, that is to say, the sides of the radius rod are relatively oppositely inclined, and their forward ends are connected as by a fitting 44 including a pin 45, normally alined with the carriage and chassis, and a connection $c$ with the chassis providing universal movement, and forward and rearward play, of the pin, relative to the chassis.

Similarly between the rear axle of the carriage and a chassis point $a'$ to the rear of the carriage, there are hinge elements 46 and 47 secured to the axle, hinge fittings, or plates 48, radius bars 49 and 50, and a fitting 51 including a pin 52.

Each of the connections $c$ for the pins 45 and 52, includes a ball 53 through which its pin may freely move diametrically, and a socket 54 in which such ball may freely move universally.

The sockets 54 are carried in fixtures or laterals 55 and 56, at the points $a$ and $a'$; the fixture 55 being the forward chassis point $a$ and the fixture 56 being the rear chassis point $a'$.

The spaced apart carriage sides 9 and 10 and the pairs of radius rods 42, 43, and 49, 50, and the axle bearing points, that is to say, the balls 12, 13, 14 and 15 constitute a link-motion in which the several axle bearing points may be independently deflected vertically, forwardly and rearwardly; and this feature is broadly new, basic and pioneer.

In all former constructions such deflections were compensated for by the carriage springs only, and in consequence of which was liability of damage and breakage of the springs, which liability is avoided by this novel construction.

The structure of my invention while affording free flexure between the chassis and the several recited axle bearing points of the carriage, serves to check and resist horizontal deflection of any axle bearing point relative to the train of the connected links. Let it be assumed that wheel 5 meets an obstruction on, or a depression in the road surface and is thereby raised or lowered from the plane of the remaining wheels thus tending toward a disalinement of the carriage relative to the chassis, and a distortion of the carriage frame.

The remaining wheels 6, 7 and 8 serve as anchors and together with the whole train of the link-motion, resist the deflection of the wheel 5, the result of which is a stabilizing of the chassis and its load, to the end that load swaying is minimized and the tendency for the carriage to move in a zigzag course eliminated.

By connecting the sides or parallel stays 9, 10 to the axles 3, 4 by ball and socket joints, I have avoided any tendency of the connections between the axles to cramp or bind, and by the arrangement of radius bars, axles 3, 4 and driving shafts 29, 30, 31 and 32 connected together by the eye bolt passing through and fixed to the axles, and journalled on the driving shafts and connected by the knuckles 41 to the radius bars, the axial alinement, and the parallelism of the shafts and axles are maintained irrespective of stresses and strains caused by uneven roads.

The drawing show the axle 3 as constructed with the collar 22 and the balls 12 and as being perforated between the balls and the collar 22 so that the parts may be readily assembled as shown in Figs. 5 and 6 and all are positively held in place during all sorts of service.

I claim:—

1. A carriage alining means comprising a chassis fixture, a ball and socket joint carried thereby, a radius-rod, a pin fixed at one end of the radius rod and related to said ball for movements diametrically therethrough; and means for hinging the other end of the radius-rod to a carriage element.

2. In a four wheel drive, a wheel supported axle provided with an intermediate housing and a tubular extension of such housing, and also provided with balls for universal joints on opposite sides of said housing; a second wheel supported axle provided with an intermediate housing and a rigid tubular extension thereof slidably and oscillatably related to the first named extension; said second axle also provided on opposite sides of its housing with balls for a universal joint; the balls on opposite sides of the shaft being alined with each other parallel to the shaft; shaft driving mechanism contained in said housings respectively; a shaft comprising relatively endwise adjustable, and relatively non-rotatable sections central to the housing extensions and connected to the shaft driving mechanisms contained in said housings respectively; and non-extensible means on opposite sides of said extensions, connecting the balls that are in longitudinal alinement.

In testimony whereof, I have hereunto set my hand at Los Angeles, California, this 5th day of March, 1927.

EARL C. DALRYMPLE.